United States Patent [19]

Odsberg et al.

[11] Patent Number: 5,339,512
[45] Date of Patent: Aug. 23, 1994

[54] METHOD FOR PRESTRESSING CASINGBOLTS

[75] Inventors: Hans Odsberg, Listbyvägen; Staffan Sundberg, Agatan, both of Sweden

[73] Assignee: Ovako Couplings AB, Sweden

[21] Appl. No.: 29,034

[22] Filed: Mar. 10, 1993

[30] Foreign Application Priority Data

Apr. 15, 1992 [SE] Sweden .................... 9201198

[51] Int. Cl.⁵ .................................. B21D 39/00
[52] U.S. Cl. .................................. 29/452; 254/29 A
[58] Field of Search ............... 29/452, 446; 254/29 A

[56] References Cited

U.S. PATENT DOCUMENTS

| | | | |
|---|---|---|---|
| 2,181,744 | 11/1939 | Schmidt | 29/452 |
| 3,749,362 | 7/1973 | O'Connor et al. | 29/452 |
| 4,268,011 | 5/1981 | Randall | 254/29 A |
| 4,604,003 | 8/1986 | Francoeur et al. | 29/452 |
| 4,659,065 | 4/1987 | Simms | 254/29 A |

FOREIGN PATENT DOCUMENTS

| | | |
|---|---|---|
| 0222625 | 5/1987 | European Pat. Off. . |
| 2927448 | 1/1981 | Fed. Rep. of Germany . |
| 3502521 | 8/1985 | Fed. Rep. of Germany . |
| 413868 | 5/1966 | Switzerland . |
| 1390012 | 4/1975 | United Kingdom . |

*Primary Examiner*—Mark Rosenbaum
*Assistant Examiner*—David P. Bryant
*Attorney, Agent, or Firm*—Ostrolenk, Faber, Gerb & Soffen

[57] ABSTRACT

A method for prestressing bolts arranged in places where lateral accessibility is reduced, particularly casing bolts for turbines, comprises the mounting of a bridge element (41) on the end faces of the threaded ends of support bolts (21, 23) positioned at either side of the bolt (22) selected for prestressing, and prestressing of the bolt (22) by means of hydraulic stressing means (42, 45) arranged at the bridge element (41). Also disclosed is an apparatus for carrying out the method according to the invention, the apparatus comprising a bridge element (41), a pulling sleeve (42) with hydraulic drive (45) arranged on the bridge element, and means for generation of hydraulic pressure.

5 Claims, 2 Drawing Sheets

METHOD FOR PRESTRESSING CASINGBOLTS

FIELD OF THE INVENTION

This invention relates to an apparatus and a method for prestressing bolts that are arranged in groups and parallel, are to each other and are at locations with laterally reduced accessibility, particularly casing bolts for steam and gas turbines and valves for such turbines.

BACKGROUND OF THE INVENTION

Casings for gas or steam turbines are big and heavy, and must be attached gas-tight against each other. Conventionally, this is done by utilizing a number of set bolts arranged at a distance from each other in a circle or another geometric form adapted to the peripheral area of the casing, and which are prestressed by application of substantial force. In turbines, increasing steam or gas pressure results in improved efficiency and because of this, over the years increasing prestress has been applied.

The method most widely used today for prestressing bolts is working with so-called heating bolts, that is, bolts which are heated and mechanically stressed when hot. The time needed for heating and cooling of the bolts is substantial so that even under good circumstances as many as several days are needed for mounting a casing of a large gas or steam turbine.

It is necessary to wait until the bolts have cooled down before checking whether the correct prestress has been achieved. If correct prestress has not been achieved, the heating and cooling process must be repeated, something that will further increase the time spent.

During prestressing and securing of bolts in turbine casings, similar stresses arise within the casings themselves and will remain even after all bolts have been mounted. If the bolts are mechanically prestressed, such stress in a turbine casing may be reduced by simultaneously stressing bolts symmetrically arranged in respect of the center of the casing, or by stressing in small steps, whereby the prestress for each bolt will be increased essentially to the same extent and simultaneously. Such a procedure is impossible when using the hot prestressing method which, by necessity, results in inferior prestress.

Repair and maintenance work on large turbines requires them to be taken out of service which often is very expensive. Thus, a reducing of down time required for repair or maintenance is desirable, and may be an economic necessity.

For a long time hydraulic pretensioning of bolts has been known. The hydraulic pretensioning method is substantially faster and easier to reproduce than prestress obtained by heating. However, it has not been possible to use that method for bolts in turbine casings or similar equipment where space for utilizing necessary prestressing equipment in the traditional way is limited.

SUMMARY OF THE INVENTION

The present invention discloses a method for prestressing bolts of the aforementioned kind faster and with better reproducibility in places where space for traditional application of necessary equipment is lacking.

More specifically the present invention discloses a method for hydraulically prestressing bolts in turbine casings or similar equipment, which method comprises having a bridge element bear on the threaded ends of two or more support bolts, said bolts being arranged at opposite sides of the bolt selected for prestressing, and prestressing the bolt by means of a hydraulic stressing element arranged on the bridge element.

It is preferred to mount bolts in a number of holes arranged along a straight line or a curve, for instance, holes in a turbine casing for a steam or gas turbine or in a stop or control valve for such turbine, and to secure them by locking them with nuts when under prestress, while hydraulically tensioning and locking at least one of the bolts in tensioned condition, said bolt being termed a working bolt.

For prestressing and locking of bolts of aforementioned kind, it is preferred that the following working steps be taken a) selection of a casing bolt hole intended for arranging the working bolt therein, b) mounting the working bolt in the bolt hole, by screwing on and tightening the working bolt by a nut, c) mounting a support bolt in a casing hole positioned at one side of the working bolt and another support bolt in a casing hole positioned at the other side of the working bolt, comprising screwing on and tightening of the support bolts by means of nuts, the free end faces of the support bolts preferably being substantially flat, d) mounting a bridge element having at least one through opening so that one side of the bridge element bears against and is supported by the flat end faces of the support bolts, said bridge element being positioned in a way that its through opening is moved into a position superposing the working bolt, e) inserting a pulling sleeve with a hydraulic drive into the through opening in the bridge element and screwing the pulling sleeve onto the working bolt, said hydraulic drive being made to abut the bridging element, f) activating the hydraulic drive, thereby tensioning the working bolt by the force transmitted via the pulling sleeve until a predetermined stressing of the working bolt is obtained, g) securing the working bolt in the tensioned position by tightening the nut thereon, and h) deactivating the hydraulic drive, removing the pulling sleeve from the bolt and removing the pulling sleeve with the hydraulic drive from the bridging element, and disassembling the bridging element, with the provision that step c) may precede step b).

In accordance with a preferred aspect of the invention one or several spacers are arranged between the bridge element and one or several of the support bolts when mounting the bridge element onto the support bolts.

It is furthermore preferred to arrange one or several spacers between the bridge element and one or several of the support bolts when mounting the bridge element on the support bolts in step d).

Moreover, it is preferred for one and the same bolt to function as a support bolt when a nearby bolt is to be prestressed, and as a bolt intended to be prestressed. It is also preferred for a bolt to function as a support bolt both in a prestressed and an unstressed state.

In accordance with a preferred aspect of the invention the change of prestress of a bolt of the kind described in the introduction is monitored and its prestress is controlled by hydraulic pressure.

It is also preferred to stress two or more bolts on a turbine casing or similar part simultaneously, preferably bolts having symmetric configuration in respect of the center of the casing. This will reduce stress occurring in the casing during the mounting operation and possibly remaining thereafter.

In accordance with the invention also disclosed is an apparatus for carrying out the inventive method. The apparatus comprises a bridge element, made of steel or similar material, having one or several through openings for arrangement of one or several stressing means, each such through opening having associated therewith, an individual pulling sleeve and an individual means. It is preferred for the apparatus for carrying out the method to be provided with spacers intended to be arranged between the bridge element and one or several support bolts. It is furthermore preferred to provide the apparatus with means for indication of hydraulic pressure. Moreover it is preferred for the hydraulic pressure indication means to comprise control means for limiting hydraulic pressure to prevent it from exceeding a preset value. In the embodiment of the bridge element with two or several through holes, the distances between the center of these holes are arranged to coincide with the distances between the center of two or several bolts intended to be stressed by the bridge element and stressing means arranged at the bridge element.

BRIEF DESCRIPTION OF THE DRAWING FIGURES

The invention will now be described in detail by reference to the drawing illustrating a preferred apparatus for carrying out the method, in which.

Figure 1:
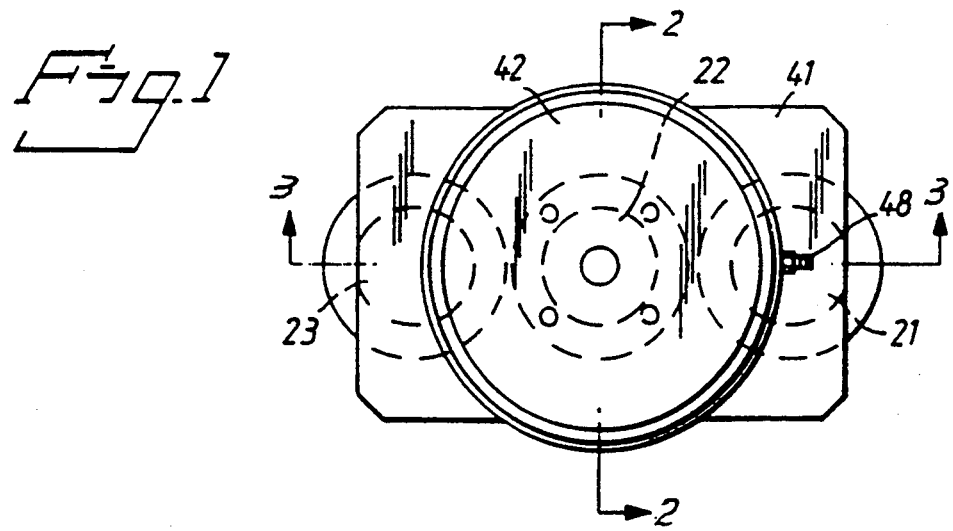
FIG. 1 is a schematic top view of the preferred embodiment.
Figure 2:
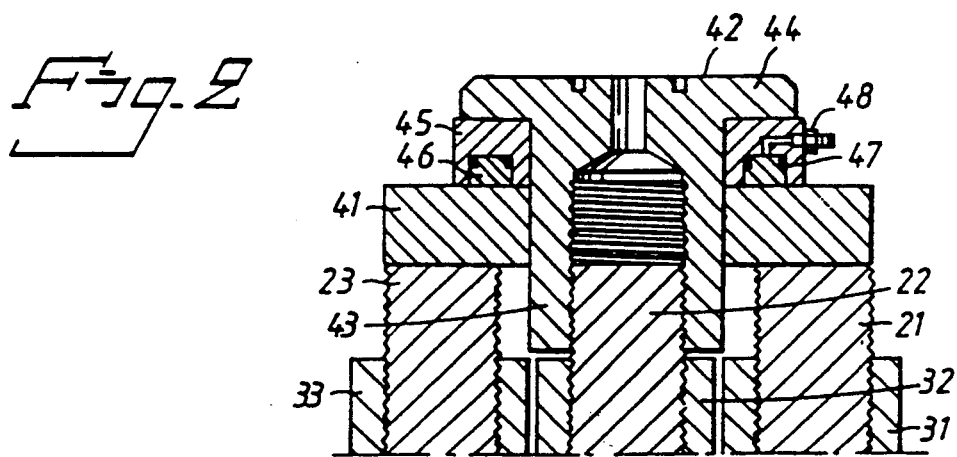
FIG. 2 is a vertical longitudinal section through line 3—3 of the object in FIG. 1, looking in the direction of arrows.
Figure 3:
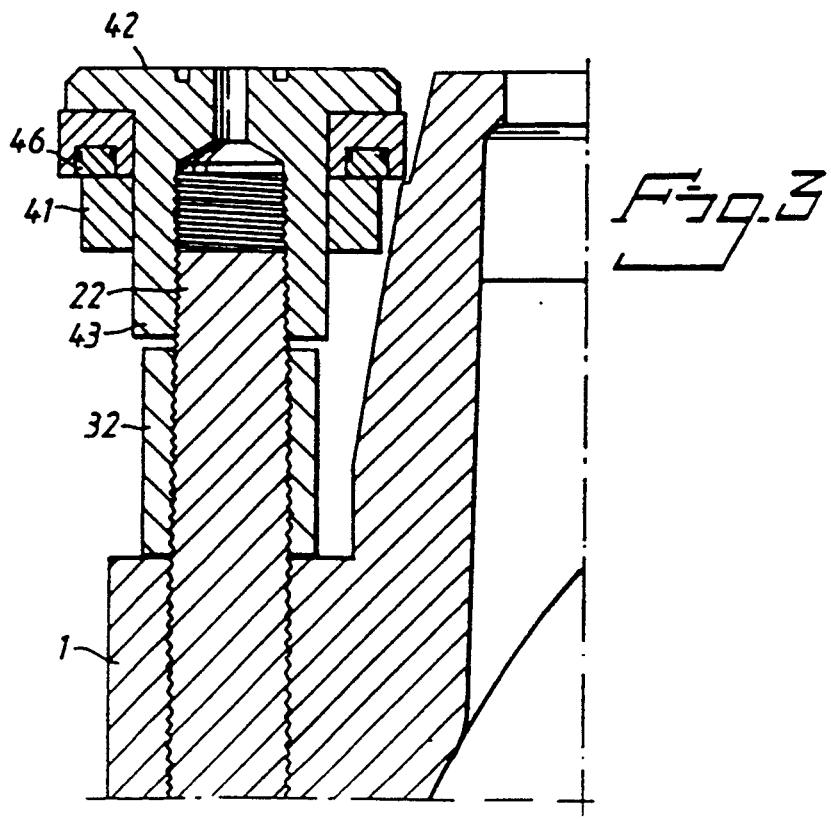
FIG. 3 is a vertical transverse section through line 2—2 of the object in FIG. 1, looking in the direction of arrows.

A casing 1 of a gas turbine is mounted on the turbine (not shown) by means of a number of parallel bolts, of which only three, bolts 21, 22, 23 are shown. In FIG. 2 nuts 31, 32, 33 are shown screwed on respective bolts 21, 22, 23 in an untensioned state with the nuts 31, 32, 33 abutting the casing 1. The casing 1 and the bolts 21, 22, 23 are shown in partial view only.

A bridge element 41, of essentially rectangular and flat form with parallel topside and underside and with partially chamfered edges rests with its underside against the flat endfaces of support bolts 21 and 23. The bridge element 41 has an opening extending between the topside and underside, which opening is symmetrically centered. The diameter of the opening is somewhat but not much larger than the external diameter of a downwardly extending sleeve part 43 of an essentially rotationally symmetric pulling sleeve 42 provided at its topside with a flange 44. Over the larger part of its length the sleeve part 43 has a bore provided with an internal thread, the bore extending upward from the lower, end of sleeve 43 which lacks a flange. The internal thread in the bore of sleeve 43 threadably engages with the external thread of bolt 22 which is intended to be pretensioned.

Adjacent to and abutting flange 44 the sleeve part 43 is surrounded by an essentially annular hydraulic element 45, the inner diameter of which is somewhat but not much larger than the outer diameter of the sleeve part 43. In the drawings the sleeve part 43 of the pulling sleeve 42 is shown in a state in which it is screwed onto the end of bolt 22, the hydraulic element 45 also abutting the bridge element 41. The hydraulic element 45 comprises an annular piston element 46 movably arranged in an annular recess of the hydraulic element and in the direction of the rotational axis of hydraulic element 45. The piston element 46 is provided with seals 47 sealing against the walls of the recess with hydraulic fluid communicating with the upper face of the piston element 46 constituting the bottom of the recess and with a conduit connection being provided for communication of hydraulic fluid between the piston element 45 and a nipple 48. Removably connected to the nipple 48 is a flexible hydraulic line (not shown) for feeding of hydraulic fluid from a hydraulic fluid compressor (not shown).

When the pressure rises in the compressor the hydraulic element 45 is activated and displaced upward or in a direction away from the piston element 46 abutting the bridge element 41. The displacement of the hydraulic element 45 is transferred to the pulling sleeve 42, and from there to the bolt 22 which is tensioned. By means of a pressure gauge (not shown) arranged at the fluid compressor, pressure readings are taken. Tensioning is stopped when a predetermined pressure has been reached. The bolt 22 is fixed in its tensioned position by tightening the nut 32 against the top of the casing 1. Thereafter, a pressure relief valve (not shown) of the fluid compressor is opened to relieve pressure in the hydraulic system to cease. The apparatus now can be easily disassembled.

In case several bolts are to be stressed at the same time, all of the hydraulic elements are preferably coupled to one and the same fluid compressor. The bolts thereby will automatically receive the same prestress.

Figure 4:
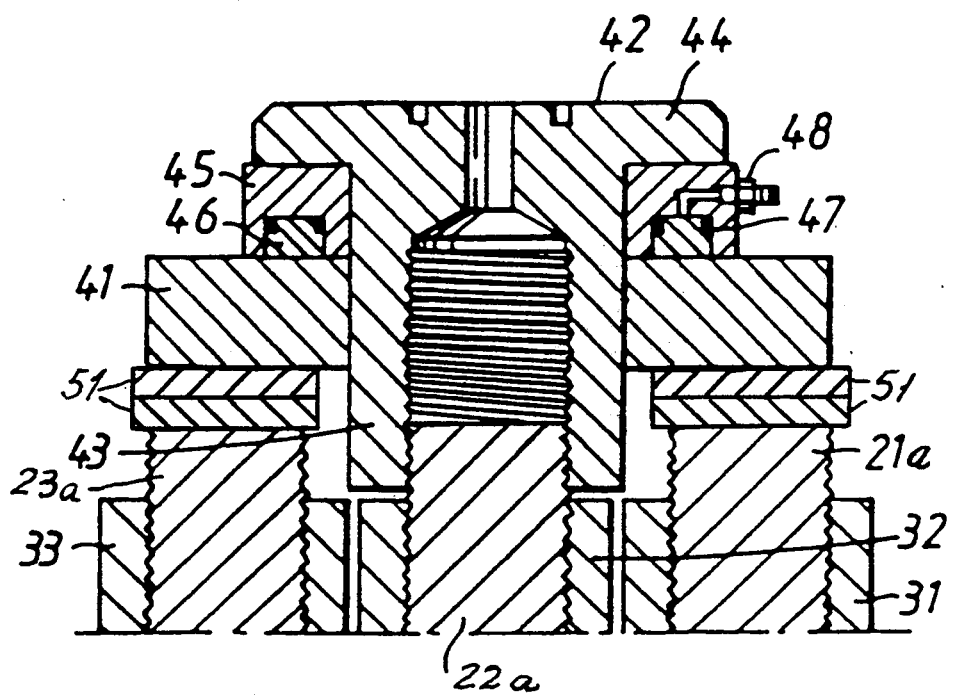
FIG. 4 is a view similar to FIG. 2 wherein spacers are interposed between the bridge member and the support studs.

In FIG. 2 bridge 41 is shown bearing directly against the free end faces of support bolts 21 and 23. For situations, as in FIG. 4, where only a very short free length of each bolt 21a, 22a, 23a extends clear of nuts 31, 32, 33 one or more spacers 51, as required, are interposed between the bottom surface of bridge 41 and end faces of support bolts 21a and 23 a, rather than providing a pulling sleeve having a shorter internally threaded sleeve portion than sleeve portion 43 in FIG. 2.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A method of prestressing parallel casing bolts, particularly casing bolts for steam and gas turbines and valves for such turbines, arranged in groups and in close proximity to each other, said method comprising:

positioning an essentially flat bridge element provided with a central through opening such that the under side of said bridge element is supported on end faces of a first and second of said casing bolts with a third of said casing bolts disposed between said first and second bolts, and with said through hole in centered superposition with the third bolt;

inserting a pulling sleeve operatively associated with an annular hydraulic means into said through opening of the bridge element, with said annular hydraulic means interposed between the upper side of said bridge element and a flange portion of said pulling sleeve;

screwing said sleeve onto said third bolt until said flange portion forces said annular hydraulic means into abutting relation with said upper side of said bridge element; and prestressing said third bolt by introducing pressurized fluid to said annular hydraulic means whereby the latter exerts a force in a first direction on said end faces of said first and second casing bolts through said bridge element and exerts a force in a second direction on said third bolt through said pulling sleeve, said second direction being opposite to said first direction.

2. The method according to claim 1, further comprising arranging spacer means between said bridge element and an end face of at least one of said first and second bolts before introducing pressurized fluid to said annular hydraulic means.

3. The method according to claim 1, also comprising utilizing said third bolt after prestressing thereof, as one of two bolts to support said bridge while said pulling sleeve is screwed onto another bolt that is to be prestressed, said another bolt being disposed between said two bolts.

4. The method according to claim 1, wherein one of said first and second bolts is in an unstressed state, while the other of said first and second bolt is in a prestressed state.

5. The method according to claim 1 in which said annular hydraulic means is a single power unit.

* * * * *